United States Patent

Paar

[11] Patent Number: 5,100,996
[45] Date of Patent: Mar. 31, 1992

[54] CATHODICALLY DEPOSITABLE, SELF-CROSSLINKING PAINT BINDERS

[75] Inventor: Willibald Paar, Graz, Austria

[73] Assignee: Vianova Kunstharz, A.G., Werndorf, Austria

[21] Appl. No.: 411,257

[22] Filed: Sep. 29, 1989

[30] Foreign Application Priority Data

Sep. 29, 1988 [AT] Austria .................. 2402/88

[51] Int. Cl.⁵ .................. C08G 18/80; C09D 175/02; C09D 175.04
[52] U.S. Cl. .................. 528/45; 525/330.6; 525/333.2; 106/287.25; 106/287.3
[58] Field of Search .................. 106/287.25, 287.3; 528/45, 330.6, 333.2

[56] References Cited

U.S. PATENT DOCUMENTS

| | | | |
|---|---|---|---|
| 3,926,875 | 12/1975 | Tsugukuni et al. | 528/45 |
| 3,947,426 | 3/1976 | Lander | 528/45 |
| 4,134,865 | 1/1979 | Tominaga | 528/45 |
| 4,134,866 | 1/1979 | Tominaga et al. | 528/45 |
| 4,163,094 | 7/1979 | Turpin | 528/45 |
| 4,274,989 | 6/1981 | Tominaga et al. | 528/45 |
| 4,507,427 | 3/1985 | Potter et al. | 528/73 |
| 4,683,285 | 7/1987 | Paar et al. | 528/45 |
| 4,757,113 | 7/1988 | Paar | 528/45 |
| 4,785,068 | 11/1988 | Tominaga et al. | 528/45 |
| 4,808,688 | 2/1989 | Paar | 528/45 |
| 4,837,291 | 6/1989 | Paar | 528/45 |
| 4,857,581 | 8/1989 | Paar et al. | 528/45 |
| 4,892,913 | 1/1990 | Paar | 528/45 |
| 4,904,361 | 2/1990 | Motohashi et al. | 528/45 |
| 4,990,579 | 2/1991 | Paar | 528/45 |

Primary Examiner—John Kight, III
Assistant Examiner—Rabon Sergent
Attorney, Agent, or Firm—Breiner & Breiner

[57] ABSTRACT

Cathodically depositable, self-crosslinking paint binders wherein crosslinkable groups are introduced into the binders at 70 to 100° C., preferably in the presence of an organic solvent inert towards isocyanates, by reacting the hydroxyl groups and/or primary and/or secondary amino groups of the binders with doubly blocked triisocyanates of the general formula -

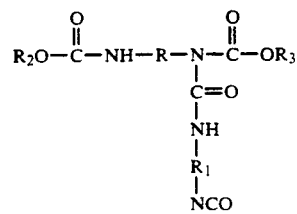

wherein
- R is an aliphatic, cycloaliphatic or aromatic radical derived from a diisocyanate,
- $R_1$ is an aliphatic, cycloaliphatic or aromatic radical derived from a diisocyanate which has NCO-groups having predominantly different reactivities, and
- $R_2$ and $R_3$ represent identical or different radicals of NCO-blocking agents, are described. The self-crosslinking binders have a high crosslinking density.

4 Claims, No Drawings

CATHODICALLY DEPOSITABLE, SELF-CROSSLINKING PAINT BINDERS

FIELD OF INVENTION

This invention relates to cathodically depositable, self-crosslinking paint binders More particularly, the invention relates to cathodically depositable, self-crosslinking paint binders having crosslinkable groups which have been introduced into the binders by the reaction of the hydroxyl groups and/or primary and/or secondary amino groups present on the binders with doubly blocked triisocyanates.

BACKGROUND OF INVENTION

DE-OS 2,252,536 discloses a process for the preparation of self-crosslinking binders for cathodically depositable electrocoating paints wherein the hydroxyl groups of epoxy resin-amine adducts are reacted with partially blocked polyisocyanates Although tri- and tetraisocyanates are referred to in a listing of the useful polyisocyanates, only the half, or semiblocked diisocyanates are used in the examples. The reference gives no information on the actual partial blocking of such tri- and tetraisocyanates so as to provide, in essence, a monoisocyanate compound.

As described in numerous references, the half-blocked diisocyanates referred to above can be used for introducing reactive groups into polymers which find application as self-crosslinking, heat-curable paint binders, especially in water-thinnable electrocoating paints. Since only one crosslinking group is introduced at any given time when the customary half-blocked diisocyanates are used, adequate crosslinking of the polymers is not fully achievable with these materials.

SUMMARY OF INVENTION

We have now found that an improvement in the chemical and mechanical properties of the films of cathodically depositable paint binders, which are self-crosslinking essentially by virtue of urethane linkages, is possible if the crosslinking component is introduced into the binder in the form of a doubly blocked triisocyanate.

Accordingly, the present invention relates to cathodically depositable paint binders, and to a process for the preparation of these binders, which are self-crosslinking at elevated temperature, characterized in that the crosslinkable groups are introduced into the binders at 70° to 100° C., preferably in the presence of an organic solvent inert toward isocyanates, by reacting the hydroxyl groups and/or primary and/or secondary amino groups of the binders with doubly blocked triisocyanates of the general formula

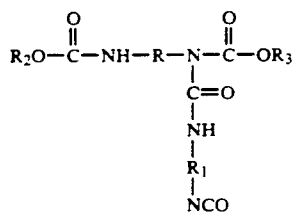

wherein

R is an aliphatic, cycloaliphatic or aromatic radical derived from a diisocyanate, $R_1$ is an aliphatic, cycloaliphatic or aromatic radical derived from a diisocyanate having NCO-groups with predominantly different reactivities, and $R_2$ and $R_3$ represent identical or different radicals of NCO-blocking agents.

The invention further relates to the use of the paint binders according to this invention for the formulation of cathodically depositable electrocoating paints.

Any resin which contains a sufficient number of isocyanate-reactive groups can be employed as the base binder resin for the reaction with the doubly blocked triisocyanates according to the present invention. The number is sufficient if the reaction with the monoisocyanate compound initially can take place and isocyanate reactive groups are still available for the subsequent crosslinking reaction. In order to be used as water-thinnable electrocoating paint binders, the base resins must possess an appropriate number of protonable groups, inasmuch as these groups are not introduced by the isocyanate component.

Numerous products which can be used as the base resins in accordance with the present invention are described in the literature. Preferred products are the epoxy resin-amine adducts of a variety of structures, as well as acrylic or polydiene (co)polymers, modified phenol ethers, polyesters, polyethers, and the like. In view of the large amount of literature available describing these materials, a detailed description of the method of preparation of these resins is not necessary. The preferred types are exemplified in the following illustrative examples.

The doubly blocked triisocyanates used according to the invention are prepared by reacting, at 70° to 120° C. and in the presence of a catalyst, if desired, 1 mol of a fully blocked diisocyanate with 1 mol of a non-blocked diisocyanate whose NCO-groups have predominantly different reactivities. It has been established that with a correct choice of reaction temperature only one NCO-group of the non-blocked diisocyanate is consumed, and the free NCO-group of the resultant allophanate compound does not react even under prolonged reaction time or storage of the product. The maximum reaction temperature must be chosen in order that no significant reaction of the free NCO-groups of the product and/or no significant cleavage of the blocking agent occurs. Any diisocyanate can be employed for the full blocking, provided its NCO-groups are accessible to blocking as well as to unblocking at temperatures between 120° and 200° C.

The diisocyanate which is reacted with the fully blocked diisocyanate in order to obtain homogeneous products are those diisocyanates which have NCO-groups possessing different reactivities. Examples of commercially available products of this type are isophorone diisocyanate or 2,4-toluylene diisocyanate. When industrial isomeric mixtures are employed, such as those present in the many commercial products of toluylene diisocyanate, i.e., 80% of 2,4-TDI and 20% of 2,6-TDI, minor reaction differences are likely to occur. These differences, however, have virtually no bearing on the use of the materials according to the invention.

Compounds which possess a reactive hydrogen atom, as known from the literature, can be used as the blocking agents. See, for example, "Methoden der Organischen Chemie" ["Methods of Organic Chemistry"], Houben-Weyl, Vol. 14/2, pp. 61–70, G. Thieme-Verlag, Stuttgart, 1963. According to definition, the blocking agents must be split-off at a temperature which is convenient in practice, with an intermediate re-formation of the isocyanate group. Examples of suitable blocking agents are monohydroxyl compounds, such as alkanols, glycol monoethers, hydroxyalkyl acrylates, dialkylalkanolamines, or ketoximes;

lactams, such as ε-caprolactam or δ-valerolactam;

CH-active compounds such as acetylacetone, acetoacetic ester or malonic ester derivatives; and aliphatic amines, such as 2-ethylhexylamine, dibutylamine, dimethylaminopropylamine or diethylaminopropylamine.

Mixtures of various blocking agents may, of course, also be used. When aminoalcohols, such as the dialkylalkanolamines or primary-tertiary amines are used, a protonable group which splits off on curing is introduced by the blocking agent.

In the preparation of the monoisocyanate compounds used according to the invention, a diisocyanate is reacted at 30° to 50° C., with the blocking agent in an amount sufficient for both the NCO-groups to be blocked. The fully blocked diisocyanate is then reacted at 70° to 120° C. with an equimolar amount of a diisocyanate which possesses NCO-groups of different reactivities to form the doubly blocked monoisocyanate. If desired, the reaction may be speeded up by using basic catalysts, such as triethylamine, or also a basic blocking agent. The addition of the diisocyanate is carried out advantageously at about 70° C., and the temperature is raised in line with the course of the reaction. At the maximum temperature, the second NCO-group must not undergo a reaction nor should the blocking agent be split-off. Under the given conditions, the reaction comes to a standstill after only one-half of the diisocyanate has reacted.

The reaction of the monoisocyanate compound with the base binder resin is carried out at 70° to 100° C., preferably in the presence of an organic solvent inert towards isocyanates, such as monoethyleneglycol monoethylether acetate or an ethyleneglycol diether, until the isocyanate groups are completely consumed. If desired, the binder prepared according to the invention can be combined with other resins.

The formulation, preparation, and processing of cathodically depositable electrocoating paints from the binders prepared according to the invention are carried out by the usual methods known to the person skilled in the art. If desired, the paints may also be applied in a conventional manner by spraying, dipping, or flow coating.

The examples below illustrate the invention without limiting its scope. All parts and percentages are parts and percentages by weight, unless otherwise indicated. The NCO-value indicates the amount of the free isocyanate groups in percent by weight.

The following abbreviations are used in the examples:

| | |
|---|---|
| TDI/80 | toluylene diisocyanate (commercial mixture of isomers: 80% of 2,4-TDI; 20% of 2,6-TDI) |
| 2,4-TDI | 2,4-toluylene diisocyanate (technical) |
| TMHMDI | trimethylhexamethylene diisocyanate |
| IPDI | isophorone diisocyanate |
| EH | 2-ethylhexanol |
| BG | monoethyleneglycol monobutylether |
| DEOLA | diethylethanolamine |
| BOX | butanone oxime |
| DEAPA | diethylaminopropylamine |
| AC | acetylacetone |
| TEA | triethylamine |
| CL | ε-caprolactam |
| DMBA | dimethylbenzylamine |
| DGDME | diethyleneglycol dimethylether |
| EGAC | monoethyleneglycol monoethylether acetate |
| EEW | epoxide equivalent weight |
| AA | acetic acid |
| FA | formic acid |
| DBTL | dibutyltin dilaurate |
| POCT | lead octoate (31% of Pb) |

(A) Preparation Of The Doubly Blocked Triisocyanate Compounds (MIC)

The diisocyanate (I) (1 mol) intended for full blocking is introduced into a suitable reaction vessel, and the blocking agent (2 mol) is added continuously at 30° to 40° C. with cooling. The reaction is then maintained at the stated temperature until all the NCO-groups have fully reacted. The mixture is warmed to 70° C., if desired after adding a catalyst, and the diisocyanate (II) (1 mol) intended for the further reaction is slowly added, the temperature being slowly raised up to the intended maximum. When the theoretical NCO-value for the monoisocyanate is reached, the temperature is maintained for a further 15 minutes. The product may be directly further processed according to the invention, or stored at room temperature.

If isocyanates with NCO-groups of different reactivities are employed as the diisocyanate (I) and as the diisocyanate (II), the reaction may be also carried out in order that the blocking agent (2 mol) is first introduced into the reaction vessel and the first half (1 mol) of the diisocyanate is added at 30° to 40° C. The temperature is then increased, and the second half (1 mol) of the diisocyanate is added and allowed to react.

The amounts, reaction conditions, and parameters are summarized in Table 1 below.

TABLE 1

| MCI | Diisocyanate(I) Parts (1 mol*) | Blocking Agent Parts (mol+) | Diisocyanate(II) Parts (1 mol*) | Catalyst % by Wt. | Max. Reaction Temp °C. | Mol- Mass | NCO Theor. | Value Found |
|---|---|---|---|---|---|---|---|---|
| 1 | 174 TDI/80 | 260 (2.0) EH | 222 IPDI | 0.5 TEA | 120 | 656 | 6.4 | 6.35 |
| 2 | 210 TMHMDI | 177 (1.5) BG 59 (0.5) DEOLA | 174 2,4-TDI | — | 105 | 620 | 6.8 | 6.7 |
| 3 | 222 IPDI | 174 (2.0) BOX | 222 IPDI | — | 110 | 618 | 6.8 | 6.8 |
| 4 | 174 TDI/80 | 234 (1.8) EH 26 (0.2) DEAPA | 174 2,4-TDI | — | 105 | 608 | 6.9 | 6.9 |
| 5 | 210 TMHMDI | 118 (1.0) BG 113 (1.0) CL | 222 IPDI | 0.8 TEA | 120 | 663 | 6.3 | 6.2 |
| 6 | 174 TDI/80 | 130 (1.0) EH 117 (1.0) DEOLA | 222 IPDI | — | 110 | 643 | 6.5 | 6.5 |
| 7 | 174 TDI/80 | 200 (2.0) AC | 174 2,4-TDI | 0.5 DMBA | 120 | 548 | 7.7 | 7.6 |
| 8 | 210 TMHMDI | 177 (1.5) BG | 174 TDI/80 | — | 110 | 620 | 6.1 | 5.4 |

TABLE 1-continued

| MCI | Diisocyanate(I) Parts (1 mol*) | Blocking Agent Parts (mol+) | Diisocyanate(II) Parts (1 mol*) | Catalyst % by Wt. | Max Reaction Temp °C. | Mol- Mass | NCO Theor. | Value Found |
|---|---|---|---|---|---|---|---|---|
| | | 59 (0.5) DEOLA | | | | | | |

*1 mol in each case
+mol amount (B) Preparation of the Base Resins (BR)

(BR 1) 500 parts of an epoxy resin based on bisphenol A/epichlorohydrin, epoxy equivalent weight (EEW) about 500, are dissolved in 214 parts of DGDME and reacted at 110° C. with 83 parts of a semiester from phthalic anhydride and 2-ethylhexanol in the presence of 0.5 g of triethylamine as catalyst to an acid value of less than 3 mg KOH/g. 120 parts of an NH-group-containing oxazolidine obtained from aminoethylethanolamine, 2-ethylhexyl acrylate and formaldehyde, and 26 parts of diethylaminopropylamine are then added and the mixture is allowed to react at 80° C. until an epoxide value of virtually zero is reached. The mixture is diluted with 200 parts of DGDME (hydroxyl value about 180 mg KOH/g).

(BR 2) A novolak resin, prepared in a known manner from 228 parts of bisphenol A, 220 parts of nonylphenol and 59 parts of 91% paraformaldehyde, which is etherified with 174 parts of propylene oxide, is dissolved in 200 parts of DGDME. The product contains 3 mol of aliphatic hydroxyl groups.

(BR 3) 228 parts of bisphenol A (1 mol) are reacted with 260 parts of diethylaminopropylamine (2 mol) and 66 parts of 91% paraformaldehyde (2 mol) in the presence of 131 parts of toluene as an azeotropic water removal agent, until 42 parts of water of reaction have separated off. The product contains 2 mol of secondary amino groups.

(BR 4) 950 parts of an epoxy resin based on bisphenol A/epichlorohydrin (EEW about 475) are reacted in 430 parts of DGDME with 105 parts (1.0 mol) of diethanolamine and 65 parts (0.5 mol) of diethylaminopropylamine at 60°-80° C. until all the epoxide groups have been fully consumed (hydroxyl value about 300 mg KOH/g).

(BR 5) A 55% solution in EGAC of a polyester obtained from 0.5 mol of isophthalic acid, 1.0 mol of trimethylolpropane, 0.7 mol of 1,6-hexanediol (acid value less than 5 mg KOH/g, hydroxyl value about 280 mg KOH/g).

(C) Preparation of the Paint Binders According to the Invention

EXAMPLE 1

1143 parts of the base resin (BR 1), corresponding to 729 parts of resin solids, are mixed at 70° C. with 312 parts of the isocyanate compound (MIC 1) in a reaction vessel provided with a stirrer, a thermometer and a dropping funnel, and are allowed to react with the temperature slowly being raised to 100° C. until an NCO-value of zero is reached. The reaction mixture is thinned with DGDME to a solids content of 60%. The product has an amine value of 64 mg KOH/g.

EXAMPLE 2

In a manner similar to that in Example 1, 834 parts of (BR 2), equivalent to 634 parts of resin solids, are reacted with 643 parts of (MIC 6), and the reaction mixture is thinned with DGDME to a solids content of 62%. The mixture is further mixed with an amount of (BR 4) corresponding to 547 parts of resin solids. The product has an amine value of 61 mg KOH/g.

EXAMPLE 3

In accordance with the procedure of Example 1, 1550 parts of (BR 4), equivalent to 1120 parts of resin solids, are reacted with 603 parts of (MIC 5), and the mixture is thinned with DGDME to a solids content of 60%. The product has an amine value of 65 mg KOH/g.

EXAMPLE 4

In accordance with the procedure of Example 1, 545 parts of the 55% solution of (BR 5) are reacted with 200 parts of (MIC 6), and the reaction mixture is thinned with EGAC to a solids content of 65%. The mixture is further mixed with an amount of (BR 1) corresponding to 333 parts of resin solids. The product has an amine value of 72 mg KOH/g.

EXAMPLE 5

In accordance with the procedure of Example 1, 643 parts of (BR 3), corresponding to 512 parts of resin solids, are reacted with 1216 parts of (MIC 4), and the reaction mixture is thinned with DGDME to a solids content of 60%. 190 parts of a bisphenol A-diglycidylether (EEW 90) and 186 parts of 2-ethylhexylglycidylether are added, and the mixture is allowed to react for an additional three-hour period at 100° C. The product has an amine value of 78 mg KOH/g.

EXAMPLE 6

In accordance with the procedure of Example 1, 1143 parts of (BR 1), corresponding to 729 parts of resin solids, are reacted with 243 parts of (MIC 3), and the reaction mixture is thinned with DGDME to a solids content of 65%. The product has an amine value of 69 mg KOH/g.

EXAMPLE 7

In accordance with the procedure of Example 1, 843 parts of (BR 2), corresponding to 643 parts of resin solids, are reacted with 930 parts of (MIC 2), and the reaction mixture is thinned with DGDME to a solids content of 65%. The product has an amine value of 27 mg KOH/g.

EXAMPLE 8

IN accordance with the procedure of Example 1, 1550 parts of (BR 4), corresponding to 1120 parts of resin solids, are reacted with 548 parts of (MIC 7), and the reaction mixture is thinned with DGDME to a solids content of 65%. 548 parts of (BR 2), corresponding to 417 parts of resin solids, are mixed in, after which the product has an amine value of 54 mg KOH/g.

EXAMPLE 9

This example is identical to Example 7, except that 930 parts of (MIC 8) are used instead of 930 parts of (MIC 2).

Preparation Of Test Paints

In accordance with the data listed in Table 2 below, the resins are treated with the stated acid and the stated catalyst, and thinned with water to the stated solids content. The pigment paste is then added to the clear varnish. After a homogenization period of 24 hours, zinc-phosphated steel panels are coated with the test paints and are stoved at temperatures stated in Table 2.

The panels have a film thickness of $23\pm2$ μm, and a resistance to salt spray (ASTM-B 117-64; detachment on cross-cut of less than 2 mm) of over 1000 hours.

The pigment paste employed is prepared in the following manner: 5 parts of a wetting agent based on an acetylene alcohol (calculated as solids, used as a 25% solution in ethylglycol) are added to 100 parts of the solid resin of the paste binder made according to Example 2 of AT-PS 380,264, and the mixture is converted to a 15% aqueous clear varnish with 24 parts of 5N lactic acid and deionized water. After the addition of 24 parts of carbon black, 1104 parts of titanium dioxide and 72 parts of basic lead silicate, the mixture is ground in a laboratory mill. The resultant pigment paste has a solids content of about 51% and a pigment/binder ratio of 12:1.

TABLE 2

| Paint No. | Parts of Binder Solution (from Ex.) | N[1] | C[2] | Clearcoat % | PP[3] | P/B[4] | S/T[5] |
|---|---|---|---|---|---|---|---|
| 1 | 167 (1) | 40 FA | 0.8 DBTL | 13 | 106 | 0.5:1 | 180 |
| 2 | 161 (2) | 50 FA | 1.0 DBTL | 15 | 106 | 0.5:1 | 160 |
| 3 | 167 (3) | 45 AA | 1.0 POCT | 15 | 85 | 0.4:1 | 150 |
| 4 | 154 (4) | 45 FA | 0.6 DBTL | 15 | 106 | 0.5:1 | 180 |
| 5 | 167 (5) | 40 FA | 0.8 DBTL | 12 | 127 | 0.6:1 | 160 |
| 6 | 154 (6) | 45 AA | — | 15 | 64 | 0.3:1 | 150 |
| 7 | 154 (7) | 60 FA | 0.5 POCT | 15 | 106 | 0.5:1 | 160 |
| 8 | 167 (8) | 50 AA | 1.0 POCT | 14 | 85 | 0.4:1 | 180 |
| 9 | 154 (9) | 60 FA | 0.5 POCT | 15 | 106 | 0.5:1 | 160 |

[1]Neutralization agent: mMol of acid per 100 g of resin solids
[2]Catalyst: % by weight of metal based on resin solids
[3]Pigment paste, amount as solids
[4]Pigment/binder ratio in dip paint
[5]Stoving temperature for the deposited paint films As will be apparent to one skilled in the art, various modifications can be made within the scope of the aforesaid description. Such modifications being within the ability of one skilled in the art form a part of the present invention and are embraced by the appended claims.

It is claimed:

1. Cathodically depositable paint binders which are self-crosslinking at elevated temperature comprising the reaction product at 70° to 100° C. of paint binders having isocyanate reactive hydroxyl groups and/or primary and/or secondary amino groups with doubly blocked triisocyanates of the general formula—

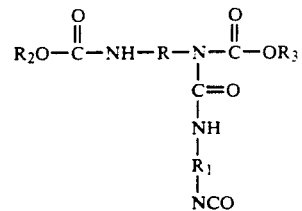

wherein
- R is an aliphatic, cycloaliphatic or aromatic radical derived from a diisocyanate,
- $R_1$ is an aliphatic, cycloaliphatic or aromatic radical derived from a diisocyanate having NCO-groups with predominantly different reactivities, and
- $R_2$ and $R_3$ represent identical or different radicals of NCO-blocking agents.

2. Cathodically depositable electrocoating paints comprising the binders of claim 1.

3. Process for the preparation of cathodically depositable paint binders which are self-crosslinking at elevated temperature comprising reacting paint binders having hydroxyl groups and/or primary and/or secondary amino groups at 70° to 100° C. with doubly blocked triisocyanates of the general formula—

$$R_2O-\overset{O}{\underset{}{C}}-NH-R-\underset{\underset{\underset{\underset{NCO}{|}}{\underset{R_1}{|}}}{\underset{NH}{|}}}{\overset{}{\underset{C=O}{|}}}N-\overset{O}{\underset{}{C}}-OR_3$$

wherein
- R is an aliphatic, cycloaliphatic or aromatic radical derived from a diisocyanate,
- $R_1$ is an aliphatic, cycloaliphatic or aromatic radical derived from a diisocyanate having NCO-groups with predominantly different reactivities, and
- $R_2$ and $R_3$ represent identical or different radicals of NCO-blocking agents.

4. The process of claim 3 wherein the reaction is carried out in the presence of an organic solvent inert towards isocyanates.

* * * * *